United States Patent [19]

Cassidy

[11] 4,054,396
[45] Oct. 18, 1977

[54] TEMPLATE HOLDER

[76] Inventor: Charles E. Cassidy, P.O. Box 26, Star Lake, N.Y. 13690

[21] Appl. No.: 717,106

[22] Filed: Aug. 24, 1976

[51] Int. Cl.² .................. B23B 49/00; B25H 7/00
[52] U.S. Cl. .................................. 408/91; 33/189;
33/DIG. 10; 83/655; 408/115 R
[58] Field of Search .................. 408/91, 115, 115 B,
408/90, 236; 83/532, 652, 655, 656; 33/DIG.
10, 189

[56] References Cited

U.S. PATENT DOCUMENTS

| 2,368,982 | 2/1945 | Guze | 408/236 |
| 2,408,595 | 10/1946 | Beard | 33/189 |
| 2,430,025 | 11/1947 | Mattias et al. | 33/189 |
| 3,381,376 | 5/1968 | Ames | 30/361 X |

Primary Examiner—Z. R. Bilinsky
Attorney, Agent, or Firm—Allen D. Brufsky

[57] ABSTRACT

A template holder for clamping a template to a workpiece including a pair of parallel rods mounted one above the other on a spacer block, the upper rod is connected to a template. The lower rod is pivotably connected to the spacer block and is connected to a backing block spaced from the template. The template is positioned on a workpiece and the backing block pivoted to a position beneath the template and work pieces to clamp the workpiece between the template and backing block. With the template locked in place, it is used to mark, cut, or in the drilling of the workpiece.

9 Claims, 3 Drawing Figures

TEMPLATE HOLDER

BACKGROUND OF THE INVENTION

This invention relates to a device for holding various types of templates in clamped relation to a piece of work so that cutting, marking, and drilling operations can be performed efficiently.

Templates for cutting, marking and drilling operations are usually held in place by hand while the operation is performed with the other hand. This is not only dangerous, but if the hand holding the template slips, an inaccurate operation results. This invention relates to a device for positively holding the template in place while all operation is performed on a workpiece.

SUMMARY OF THE INVENTION

In accordance with the invention, a pair of elongated rods are mounted one above the other in spaced horizontal planes on a spacer block. The upper rod is threadedly connected to a template or a template mounting bracket. The lower rod is connected to a planar backing block spaced from the template and is pivotably connected to the spacer block. When the template has been properly located on a workpiece, such as a piece of panelling, the backing block and lower rod is swung about the spacer block to clamp the workpiece between the template and backing block. A stop plate, slidable on the upper rod, is placed in abutment with the edge of the work and has an inward and downwardly directed slot for receiving the lower rod in snap engagement to cock the backing plate in clamped relation to the workpiece. A rod adapted to be slidably mounted on the upper rod of the template holder in perpendicular relation thereto can be used to quickly relocate the template along a line parallel to either edge of the workpiece so it can be used again.

BRIEF DESCRIPTION OF THE DRAWING

Further objects and advantages of the invention will become apparent from the following description and claims, and from the accompanying drawing, wherein:

DETAILED DESCRIPTION OF THE PREFERRED EMBODIMENT

Figure 1:
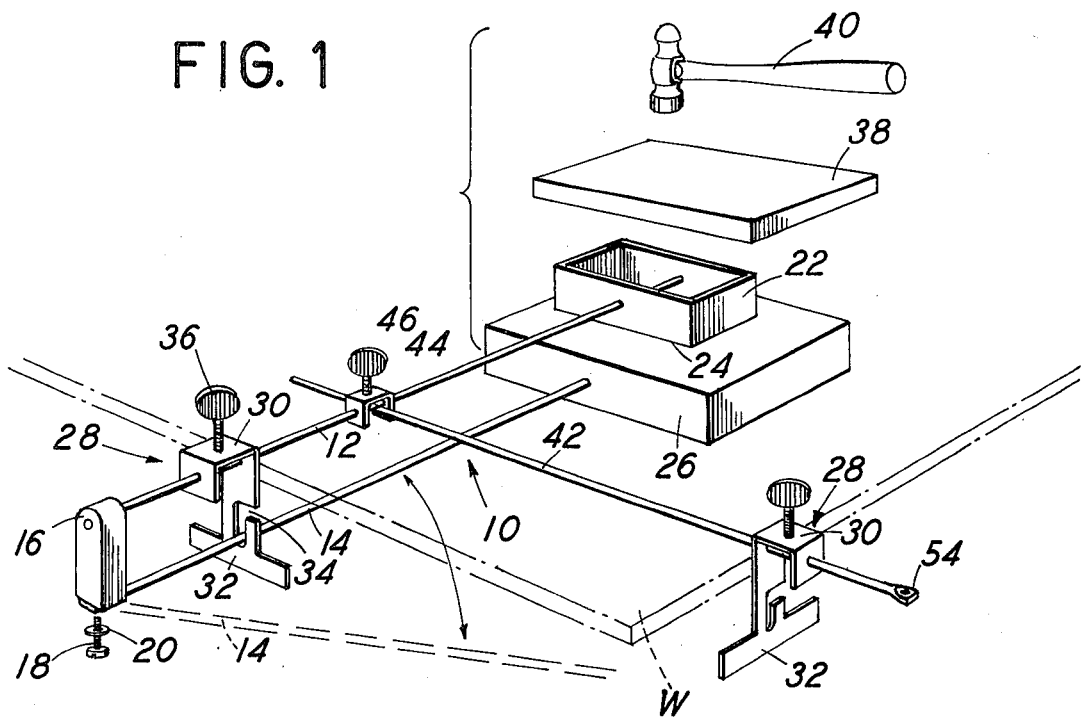
FIG. 1 is an exploded perspective view of the template holder of the present invention clamped to a workpiece, such as a piece of panelling, for cutting or marking a switch box opening in the panelling.
Figure 2:
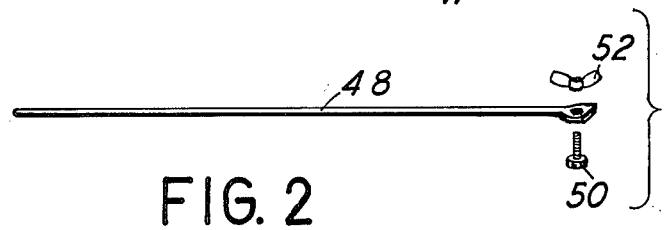
FIG. 2 is an exploded perspective view of an extension rod used to realign the template holder of FIG. 1.
Figure 3:
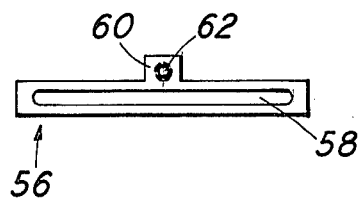
FIG. 3 is a front view in elevation of a template mounting bracket for holding another template on the holder of FIG. 1.

Referring now in detail to the drawing, wherein like numerals indicate like elements throughout the several views, the template holder 10 of the present invention includes a pair of elongated rods 12 and 14 mounted one above the other in spaced horizontal planes one a spacer block 16. Block 16 threadedly receives one end of upper rod 12, while an end of rod 14 is flattened and pivotably connected by a screw 18 and washer 20 to the bottom of block 16.

The upper rod 12 is threadedly connected at its opposite end to a rectangular template 22 having a lower marking or cutting edge 24. The lower rod 14 is threadedly connected at its opposite end to a wooden planar backing block 26 spaced from template 22. Normally, backing block 26 is pivoted by rod 14 to a position indicated by the dotted lines in FIG. 1 away from template 22. When the template 22 has been properly located on a workpiece W, such as a piece of panelling, the backing block 26 is swung on rod 14 relative to spacer block 16 beneath workpiece W to position the workpiece W between the template 22 and backing block 26.

A stop plate 28, provided with an inverted U-shaped upper portion 30, slidably receives therethrough upper rod 12. Connected to one leg of U-shaped upper portion 30 is an inverted T-shaped abutment plate 32. The T-shaped abutment plate 32 includes an inwardly and downwardly directed slot 34. Stop plate 28 is slid along upper rod 12 so that T-shaped abutment plate 32 engages one of the edges of workpiece W and is tightened to upper rod 12 by a thumbscrew 36. Lower rod 14 is then snapped into slot 34 to lock backing plate 26 and template 22 in clamped relation to workpiece W. A block 38 can then be positioned over template 22 and hit with a hammer 40 to mark the workpiece W with an outline defining a switch box or to drive edge 24 of template 22 through the workpiece W to cut the workpiece.

A third rod 42 can be slidably mounted on the top of rod 12 in perpendicular relation thereto and clamped to the rod 12 by an inverted U-shaped bracket 44 slidably receiving rod 12 therethrough and a thumbscrew 46 received in the bight of bracket 44. Rod 42 includes a stop 28 slidably mounted thereon which is first abutted with a perpendicular edge of workpiece W. Template 22 can then be quickly relocated along a line parallel to either edge of workpiece W so it can be quickly secured by removing rod 14 from slot 34 to release the template, sliding the template 22 and rod 12 in bracket 44 of the bracket 44 along rod 42, and repositioning rod 14 in slot 34 in stop plate 28. If necessary, an extension rod 48 can be connected to the flat end 54 of rod 42 by a screw 50 and wing nut 52 to provide an increased length for rod 42. Stop plate 28 is obviously positioned on the shank portion of rod 48.

It should also be understood that other templates may be substituted for template 22. For example, a slotted template mounting bracket 56 having an elongated slot 58 and a flange 60 for receiving rod 12 in threaded engagement in a threaded hole 62 may be connected to the other end of rod 12 in lieu of template 22. Bracket 56 can hold various templates with a small bolt through the edge of the template and slot 58. A drill guide can be so held for drilling holes in the side of a workpiece, with rod 14 and backing block inactive. The drill guide can be slid along slot 58 to reposition the drill guide for additional hole drilling. Other size templates for pipes, electric outlets, etc., could be connected to upper rod 12.

I claim:
1. A template holder comprising:
a spacer block mounting a pair of rods one above the other in a parallel, horizontal planes, the lower one of said rods being pivotably connected to said block for movement in its horizontal plane relative to the upper one of said rods;
template means fixed to an end of said upper rod;
a backing block fixed to an end of said lower rod adapted to be positioned beneath said template means for clamping a workpiece therebetween; and a stop plate for abutment with the edge of a workpiece slidable on said upper rod, said stop plate including an inwardly and downwardly directed slot for receiving said lower rod in snap engagement.

2. The template holder of claim 1 wherein said stop plate includes an upper inverted U-shaped portion slidably receiving said upper rod therethrough, and an inverted T-shaped lower portion connected to one of the legs of said U-shaped portion for abutment with a workpiece, said inverted T-shaped portion including said slot.

3. The template holder of claim 2 wherein said template means includes a cutting edge on its lower surface.

4. The template holder of claim 2 including means for clamping said stop plate to said upper rod.

5. The template holder of claim 4 wherein said clamping means includes a thumbscrew in the bight portion of said inverted U-shaped portion of said stop plate.

6. The template holder of claim 1 including a third rod slidably mounted on said upper rod perpendicular thereto a stop plate for the abutment with the edge of a workpiece slidable on said third rod.

7. The template holder of claim 6 including means for clamping said third rod to said upper rod.

8. The template holder of claim 7 wherein said clamping means includes:
   an inverted U-shaped bracket slidably mounted on said upper rod receiving said third rod between the bight portion of said bracket and upper rod; and
   a thumbscrew for clamping said third rod between said upper rod and bight portion.

9. The template holder of claim 1 wherein said template means includes a template mounting bracket having an elongated slot perpendicular to the longitudinal axis of said upper rod.

* * * * *